Patented Dec. 9, 1952

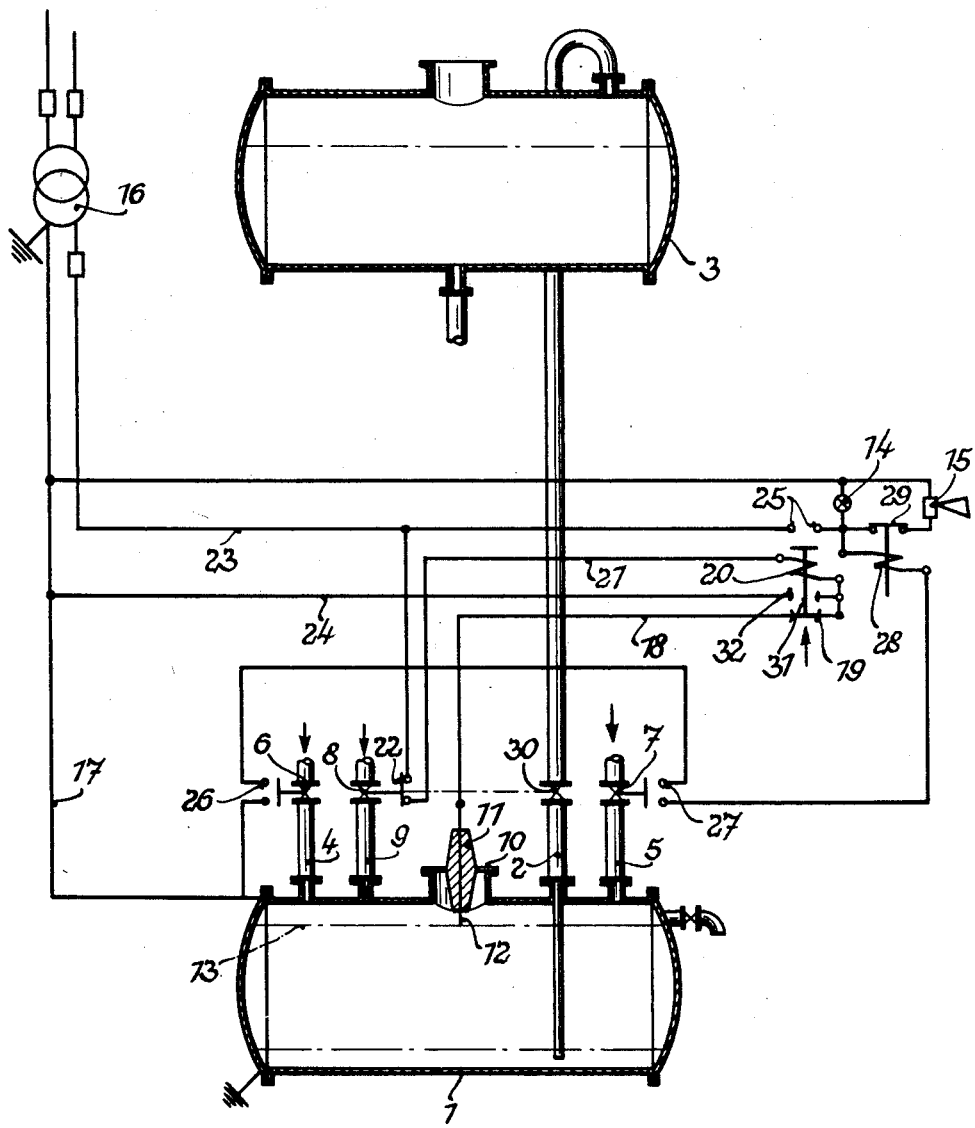
Inventor
EUGEN KEMPER
By Thomas J. P. O'Brien
His Attorney

2,621,240

UNITED STATES PATENT OFFICE 2,621,240

LIQUID LEVEL CONTROL AND INDICATOR DEVICE

Eugen Kemper, Bochum-Harpen, Germany, assignor, by mesne assignments, to Koppers Company, Inc., Pittsburgh, Pa., a corporation of Delaware Application December 22, 1950, Serial No. 202,179
In Germany December 30, 1949

4 Claims. (Cl. 177—311)

The invention relates to an electric indicator apparatus for the control of the liquid level in pressure vessels which are filled with a corrosive liquor such as sulphuric acid.

The known electric indicator devices for the control of the maximum liquid level are operated in such a way that the electric conductive liquor closes a circuit when reaching a certain level. The liquor then continues to serve as path of current for the indicator devices as long as it touches a contact element extending from above into the liquor surface. It is possible that the continuance of the current will cause a chemical decomposition of the liquor resulting in the formation of oxyhydrogen gas in case sulphuric acid is used. It is obvious that this manner of level control is very dangerous.

It is an object of my invention to provide improvements in such an indicator apparatus whereby the filling of the pressure vessel up to the level of the contact element with an electric conductive liquor may be performed for operation of the indicator device without danger of production of explosive gases such as oxyhydrogen gas.

According to my invention the indicator apparatus comprising a main circuit which is energized by an electric impulse in an electric circuit in which the electric conductive liquor and the contact element extending from above into the region of the maximum liquid level are arranged. In a preferred embodiment of my invention the said electric impulse caused by the ascending liquor in the pressure vessel is given in a separate circuit for energizing the main circuit which separate circuit is interrupted as soon as the indicator apparatus in the main circuit indicate that the maximum liquid level has been reached.

The advantage of the new electric arrangement according to my invention is to be seen from the fact that the liquor is used as a path for the electric current only for a very short time so that the formation of dangerous gases by chemical decomposition of the liquor is suppressed.

It is of advantage to use more than only one indicator for the maximum liquid level indication, for instance one optical and one acoustical indicator. Furthermore, it is advantageous to influence and control the indicators by operation of valves provided in the liquid and air pressure pipe lines for such pressure vessels.

In the event that optical and acoustical indicators are used the invention provides the main electric circuit with the optical indicator and a stop switch therefor, and the acoustical indicator and a stop switch therefor, the latter being influenced by the liquor feed line valve. When the liquor feed line is closed by its valve, only the acoustical indicator portion of the main circuit but not the optical indicator portion of the main circuit is stopped. The optical indicator in the main circuit may be operated independently of the operation of the acoustical indicator through its switch, which is influenced by the pressure air valve, so that the optical indicator is not stopped when the acoustical indicator is stopped but may be operated until the air valve is opened and the pressure air has been fed into the pressure vessel for pressing down the liquid level in the pressure vessel.

The circuit arrangements for a maximum liquid level control according to my invention is simple and clear and there is no need for use of mechanical operating means such as floats swimming in the corrosive liquor.

A preferred embodiment of my invention is diagrammatically shown on the accompanying drawing.

The liquid is filled into the pressure vessel 1 when empty through the two liquid feed lines 4 and 5 at which time the air line 9 and liquid outlet line 2 are closed. When the vessel is filled, the feed lines 4, 5, are closed and lines 9 and 2 are opened. From the filled vessel 1 the liquor is transported through a liquid outlet pipe line 2 controlled by valve 30 into the overhead tank by means of air pressure from air line 9 at which time the liquid inlet lines 4, 5, are closed. When the vessel is to be refilled the lines 2 and 9 are closed and the lines 4, 5 are opened. The liquid feed lines 4 and 5 are controlled by two valves 6 and 7. The pressure medium, e. g. compressed air, which is fed into the pressure vessel by a pipe line 9 is controlled by the valve 8.

The pressure vessel 1 has a steam dome shaped top element 10 in which a pressure proof electric insulator 11 is arranged. The electric conductor 18 through said insulator has a contact element 12 which extends into the region of the maximum liquid level as indicated by dotted line 13.

The state of the maximum liquid level having been reached in the pressure vessel 1, is announced by a combined optical and acoustical indicator apparatus 14 and 15 in which the acoustical indicator might be a horn. The source of current, for instance a transformer 16 is electrically connected with the pressure vessel 1 by a conductor line 17. When the liquid in the pressure vessel 1 has risen up to the level of the dotted line 13 it touches the contact element 12 of the conductor line 18 and the following path of current in the impulse circuit is accomplished: Conductor line 17—pressure vessel 1—liquor—contact 12—line 18—contact 19—coil 20—line 21—switch 22—and line 23.

The magnetic field of the coil 20 lifts the relay armature 31 as indicated by the arrow. The upward movement of the relay armature results in interrupting the contact 19 so that the current flow of the impulse circuit through the pressure vessel is stopped. Simultaneously the coil 20 is connected with line 17 by contact 32 and line 24 forming a holding circuit comprising conductor line 17, line 24, contact 32, coil 20, line 21, switch 22, and line 23, and the interruption 25 is closed in the main circuit comprising conductor 17, indicators 14, 15, switches 29, 25 and line 23. Closing of the interruption 25 causes the electric tension to be given to the indicator apparatus 14 and 15.

The horn 15 keeps in action until the liquor feed line valves 6 and 7 and at the same time the stop switches 26 and 27 have been closed in the auxiliary circuit for the horn comprising line 17, switches 26, 27, coil 28, and line 23. Thereby the coil 28 is energized and the contact 29 is interrupted in the acoustical portion of the main circuit so that the horn 15 stops sounding leaving the optical portion of the main circuit closed.

The pressure vessel 1 is now entirely filled with liquid. This stage is still indicated by the optical indicator 14 in the main circuit which keeps showing until the pressure air valve 8 and the valve 30 connected therewith are opened. The movement of the valves 8 and 30 causes simultaneously the switch 22 to be opened in the holding circuit. The coil 20 is de-energized and the relay armature 31 falls back into the position as shown on the drawing, thus opening the holding circuit at 32, and the main circuit for the indicators at 25, and closing the impulse circuit at 19.

Should the level of liquid be above the lowermost point of contact with electrode 12 while valves 8 and 30 are open, there will be no continuous flow of current but merely repeated impulses in the impulse circuit, since opening of valve 8 also opens switch 22 in the holding circuit. There thus will be a repeated breaking of the impulse circuit until the level of the liquor 13 falls below the lowermost point of the electrode 12.

When the liquor has sunk so far that its level is no longer in contact with the contact element 12 and the valves 8 and 30 together with the electrical switch 22 have been again closed for the next refilling operation, the indicator apparatus are both still out of action. The indicators start working again only when the liquid level has again reached the contact element 12 after the liquor feed line valves 6 and 7 have been opened for refilling the vessel 1. Thereafter the described process is repeated.

It is obvious that various changes may be made in details within the scope of my claims without departing from the spirit of my invention. It is, therefore, to be understood that my invention is not to be limited in all its aspects to the specific details shown and described.

What I claim is:

1. In an electrical indicator apparatus for maximum liquid level control of pressure vessels filled with corrosive liquors, such as sulphuric acid, comprising: an electrically insulated contact element arranged in a pressure vessel in such manner that the rising electric conductive liquid level can touch said contact element; a main electrical circuit comprising an optical indicator and an acoustical indicator for indicating the level of the liquid; an impulse circuit comprising in series a source of current, a wall of the pressure vessel, the electric conductive liquid and the contact element in said vessel, and indicator energizing means operable by the flow of current through the impulse circuit for energizing the main indicator circuit and at the same time opening a portion of the impulse circuit and operable to non-energizing relation with the main indicator circuit and to reclose that portion of the impulse circuit on cessation of flow of current through the impulse circuit; a holding circuit for holding said last mentioned means in its position for energizing the main indicator circuit and for opening the impulse circuit; means for de-energizing the holding circuit to permit the indicator energizing means to operate to non-energizing relation with the main indicator circuit and to reclose the impulse circuit for a subsequent impulse, and valve-controlled liquor feed-line conduit means for introducing liquor into said vessel; the combination of an auxiliary circuit for opening and closing the acoustical indicator portion of the main indicator circuit, said auxiliary circuit comprising an auxiliary relay with a contact in series with the acoustical indicator, and electrical switch means for another portion of the auxiliary circuit and operable by the valve means for the liquor feed-line to said vessel, to cause said auxiliary circuit to operate to close the contact in series with the acoustical indicator when said valve means is open, for sounding of the acoustical indicator, and to open the contact when said valve means is closed, to cause cessation of the audible indicator while still leaving the optical indicator available for level indication.

2. In electrical indicator apparatus for maximum liquid level control of pressure vessels filled with corrosive liquors, such as sulphuric acid, comprising: an electrically insulated contact element arranged in a pressure vessel in such manner that the rising electric conductive liquid level can touch said contact element; an indicating system for indicating the level of liquid; an impulse circuit comprising in series a source of current, a wall of the pressure vessel, the electric conductive liquid and the contact element in said vessel, and indicator energizing means operable by the flow of current through the impulse circuit for energizing the indicator system and at the same time opening a portion of the impulse circuit, and operable to reclose that portion of the impulse circuit on cessation of flow of current through the impulse circuit, a holding circuit for holding said last mentioned means in its position for energizing the indicator system and for opening the impulse circuit; and a valve-controlled pressure air inlet-conduit for introducing compressed air into said vessel; the combination of an electric switch for the holding circuit, operable by the valve for the pressure air inlet conduit to open the holding circuit, when the valve is open, to permit the indicator energizing means to operate to reclose the impulse circuit for a subsequent impulse, and to close said holding circuit when the valve is closed.

3. Electrical indicator apparatus for maximum liquid level control in pressure vessels which are filled with corrosive liquors, such as sulphuric acid, comprising: an electrically insulated contact element arranged in a pressure vessel in such manner that the rising electric conductive liquid level can touch said contact element; a main electric circuit comprising an optical indicator and an acoustical indicator for indicating the level of the liquid; a holding circuit; an impulse circuit comprising in series the wall of said vessel, the liquid and the contact element in said vessel, and the coil of a main relay; and a common source of current for said circuits, said main relay being energizable by an impulse of the current from said source through the impulse circuit when the liquid level in the vessel touches the contact element therein, and the armature of said relay being lifted thereby, said armature having separate contacts for closing a portion of the impulse circuit, a portion of the holding circuit, and a portion of the main indicator circuit with the contacts spaced to open the impulse circuit and close the holding circuit and the main indicator circuit, when the armature is lifted by an impulse in the relay coil by way of the impulse circuit, and to close the impulse circuit and open the holding circuit and the main indicator circuit, when the coil is de-energized by the opening of the impulse circuit when said armature is lifted and when the liquid level in said vessel leaves contact with the contact element therein; said coil also forming a part of the holding circuit and being operative to hold the armature with the contacts for the holding circuit and the main indicator circuit in their closed position, when the armature is elevated by an impulse in the coil from the impulse circuit, thereby maintaining the impulse circuit open at the relay and thus preventing the formation of dangerous gases by chemical decomposition of the electrically conductive liquid in the vessel by the electric current from the common source while such current continues to flow through the holding circuit and the main indicator circuit to operate the optical and acoustical indicators; and means for opening the holding circuit at another part thereof to de-energize the main relay to open the holding circuit at the relay and to open the main indicator circuit, to stop the indicators and restore the main relay to the impulse circuit for a succeeding impulse by means of an impuuse through the liquid in electrical contact with the contact element in the vessel.

4. Apparatus as claimed in claim 3, and in which the vessel is provided with valve-controlled liquid inlet-conduit means as well as a valve-controlled pressure air inlet-conduit, and said means for opening the holding circuit at another part thereof comprises an electrical switch in the holding circuit which is operable to open position by the opening of the valve for inflow of pressure air to the vessel, to interrupt the current energizing the main relay in the holding circuit and thereby putting the indicator circuit out of action and the impulse circuit back into series with the relay, when the air inlet conduit is open to the vessel; and in which the acoustical indicator portion of the main indicator circuit is provided with an auxiliary relay having an armature contact in series with the acoustical portion, and an auxiliary circuit for energizing said relay, said auxiliary circuit being controlled by switch means under the influence of the liquid feed line valve, to operate the auxiliary circuit to open the acoustical portion of the indicator circuit and thus cause cessation of its sounding, when the valve is closed, while still leaving the optical portion of main indicator circuit still closed and active under the action of the holding circuit so long as the valve for the pressure air line is closed.

EUGEN KEMPER.

REFERENCES CITED

The following references are of record in the file of this patent:

UNITED STATES PATENTS

| Number | Name | Date |
|---|---|---|
| 2,229,036 | Bird et al. | Jan. 21, 1941 |
| 2,233,297 | Polin et al. | Feb. 25, 1941 |
| 2,394,220 | Wagner | Feb. 5, 1946 |
| 2,600,132 | Seaton | June 10, 1952 |